United States Patent
Homma et al.

(10) Patent No.: US 11,618,958 B2
(45) Date of Patent: Apr. 4, 2023

(54) HYDROGEN-OXYGEN GENERATION SYSTEM AND HYDROGEN-OXYGEN GENERATION METHOD

(71) Applicants: MITSUBISHI HEAVY INDUSTRIES, LTD., Tokyo (JP); JAPAN AEROSPACE EXPLORATION AGENCY, Tokyo (JP); KYUSHU UNIVERSITY, NATIONAL UNIVERSITY CORPORATION, Fukuoka (JP)

(72) Inventors: Atsuko Homma, Tokyo (JP); Kenichi Nagamoto, Tokyo (JP); Naoki Ogawa, Tokyo (JP); Yuta Nakatsuchi, Tokyo (JP); Hidehiko Tajima, Tokyo (JP); Yusaku Nasu, Tokyo (JP); Yoshitsugu Sone, Tokyo (JP); Hiroshige Matsumoto, Fukuoka (JP)

(73) Assignees: MITSUBISHI HEAVY INDUSTRIES, LTD., Tokyo (JP); JAPAN AEROSPACE EXPLORATION AGENCY, Tokyo (JP); KYUSHU UNIVERSITY, NATIONAL UNIVERSITY CORPORATION, Fukuoka (JP)

( * ) Notice: Subject to any disclaimer, the term of this patent is extended or adjusted under 35 U.S.C. 154(b) by 0 days.

(21) Appl. No.: 17/287,304

(22) PCT Filed: Oct. 24, 2019

(86) PCT No.: PCT/JP2019/041718
§ 371 (c)(1),
(2) Date: Apr. 21, 2021

(87) PCT Pub. No.: WO2020/085434
PCT Pub. Date: Apr. 30, 2020

(65) Prior Publication Data
US 2021/0355590 A1    Nov. 18, 2021

(30) Foreign Application Priority Data

Oct. 26, 2018 (JP) .............................. JP2018-202358

(51) Int. Cl.
*C25B 15/08*        (2006.01)
*C25B 1/04*         (2021.01)
(Continued)

(52) U.S. Cl.
CPC ................ *C25B 15/08* (2013.01); *C25B 1/04* (2013.01); *C25B 9/23* (2021.01); *C25B 15/02* (2013.01); *C25B 15/023* (2021.01)

(58) Field of Classification Search
CPC ....................................................... C25B 1/04
See application file for complete search history.

(56) References Cited

U.S. PATENT DOCUMENTS 5,316,643 A *  5/1994  Ahn ..................... H01M 4/8615
                                                        204/266
2004/0011668 A1*  1/2004  Shiepe .................. H01M 8/247
                                                        204/252
(Continued)

FOREIGN PATENT DOCUMENTS

DE              10220172  A1 *  11/2003  ............. C25B 15/02
DE       10 2012 018 243         3/2014
(Continued)

OTHER PUBLICATIONS

Machine translation of DE-10220172-A1 of Kurzweil. (Year: 2003).*
(Continued)

*Primary Examiner* — Brian W Cohen
(74) *Attorney, Agent, or Firm* — Wenderoth, Lind & Ponack, L.L.P.

(57) ABSTRACT

A hydrogen-oxygen generation system includes an electrolytic cell configured to generate hydrogen and oxygen by electrolyzing water, and discharge the hydrogen and the
(Continued)

oxygen as separate generated gasses. An accumulator includes a water storage chamber configured to store the water, and a gas chamber configured to receive a pressurized gas, and the water storage chamber and the gas chamber are separated from each other by an elastic body membrane. The accumulator is configured to transfer the water stored in the water storage chamber toward the electrolytic cell at a transfer pressure in accordance with a pressure of the pressurized gas in the gas chamber. A water supply unit is configured to supply the water to the water storage chamber, and a gas supply unit is configured to supply the pressurized gas to the gas chamber.

10 Claims, 8 Drawing Sheets

(51) Int. Cl.
    *C25B 15/02*     (2021.01)
    *C25B 9/23*     (2021.01)
    *C25B 15/023*     (2021.01)

(56) References Cited

U.S. PATENT DOCUMENTS

| | | |
|---|---|---|
| 2011/0198235 A1 | 8/2011 | Takeuchi et al. |
| 2015/0299872 A1* | 10/2015 | Kirkpatrick ............... C25B 9/17 |
| | | 204/278 |

FOREIGN PATENT DOCUMENTS

| | | |
|---|---|---|
| JP | 05-109418 | 4/1993 |
| JP | 10-330980 | 12/1998 |
| JP | 2006-131957 | 5/2006 |
| JP | 2011-162864 | 8/2011 |

OTHER PUBLICATIONS

International Search Report dated Dec. 3, 2019 in corresponding International (PCT) Application No. PCT/JP2019/041718.
Office Action dated Dec. 22, 2022 in German Patent Application No. 11 2019 005 348.5, with English translation.

* cited by examiner

HYDROGEN-OXYGEN GENERATION SYSTEM AND HYDROGEN-OXYGEN GENERATION METHOD

FIELD

The present invention relates to a hydrogen-oxygen generation system and a hydrogen-oxygen generation method.

BACKGROUND

Water electrolyzation is known as a method of generating hydrogen and oxygen. A known system configured to electrolyze water includes an anode chamber and a cathode chamber separated from each other by a separation membrane at an electrode unit, where oxygen including no liquid water is obtained from the anode chamber, and hydrogen is obtained from the cathode chamber in which supplied water exists (for example, Japanese Patent Application Publication No. 2006-131957, hereinafter "JP 2006-131957").

SUMMARY

Technical Problem

In the system disclosed in JP 2006-131957, supplied water is circulated to generate flow so that hydrogen is separated and removed from the surface of the membrane because a hydrogen generation reaction occurs on the surface of a cathode, and thus generated hydrogen bubbles accumulate on the surface of the cathode and the area of contact between the cathode and the supplied water decreases, which potentially decreases the efficiency of electrolyzation. In addition, in the system disclosed in JP 2006-131957, gas-liquid separation of hydrogen and the supplied water is performed by centrifugal separation because generated hydrogen potentially exists in the supplied water, and thus a reverse reaction of electrolyzation occurs, which potentially decreases the efficiency of electrolyzation. With this configuration, the system disclosed in JP 2006-131957 has an issue of having an increased size due to a circulation facility and a centrifugal separation facility for the supplied water.

In the system disclosed in JP 2006-131957, when the amounts of generated hydrogen and oxygen are small, the amount of necessary supplied water decreases, and a pump configured to supply water enters the state of repeating intermittent activation and stopping, which causes pulsation in the water transfer and makes water supply unstable, and as a result, system control may become difficult.

The present invention has been made in view of the foregoing, and an object of the present invention is to provide a hydrogen-oxygen generation system and a hydrogen-oxygen generation method that can reduce size increase due to a circulation facility and a centrifugal separation facility for the supplied water and reduce instability of water supply.

Solution to Problem

In order to solve the above-described problems and achieve the object, a hydrogen-oxygen generation system includes an electrolytic cell configured to generate hydrogen and oxygen by electrolyzing supplied water and discharge the generated hydrogen and oxygen as separate generated gasses; an accumulator including a water storage chamber in which water is stored and a gas chamber to which pressurized gas is supplied, the water storage chamber and the gas chamber being separated from each other by an elastic body membrane, the accumulator being configured to transfer the water stored in the water storage chamber toward the electrolytic cell at transfer pressure in accordance with a pressure of the pressurized gas in the gas chamber; a water supply unit configured to supply water to the water storage chamber; and a gas supply unit configured to supply the pressurized gas to the gas chamber.

With this configuration, since the electrolytic cell configured to generate hydrogen and oxygen by electrolyzing supplied water and discharge the generated hydrogen and oxygen as separate generated gasses is used, the amount of hydrogen bubbles accumulated on the surface of a cathode and the amount of hydrogen remaining in supplied water are significantly reduced, and thus a circulation facility and a centrifugal separation facility for supplied water are not needed, which leads to reduction of size increase of the system. In addition, since the transfer pressure of supplied water is controlled by the accumulator, the occurrence of pulsing to transferred water is reduced, which leads to reduction of instability of water supply.

In this configuration, the gas supply unit preferably supplies one of the generated gasses generated by electrolyzing water at the electrolytic cell to the gas chamber as the pressurized gas. With this configuration, generated gas resources can be effectively utilized.

In the configuration in which the gas supply unit supplies the generated gas as the pressurized gas, the gas supply unit preferably merges the pressurized gas discharged from the gas chamber into a gas transfer pipe through which the generated gas is supplied to the gas chamber. With this configuration, generated gas resources can be further effectively utilized.

On the other hand, in the configuration in which the gas supply unit does not supply the generated gas as the pressurized gas, the gas supply unit preferably supplies stock gas to the gas chamber as the pressurized gas. With this configuration, when it is difficult to supply generated gas as pressurized gas, or when it is not desired to supply generated gas as pressurized gas, as well, it is possible to excellently use the configuration that can reduce size increase and instability of water supply.

In the configuration in which the gas supply unit supplies stock gas to the gas chamber as the pressurized gas, it is preferable that the stock gas is nitrogen, and the gas supply unit merges nitrogen discharged from the gas chamber into a gas transfer pipe for oxygen generated by electrolyzing water at the electrolytic cell. With this configuration, stock gas resources can be effectively utilized.

In these configurations, it is preferable that a transfer pump is further included that is disposed on a transfer pipe for water between the water storage chamber of the accumulator and the electrolytic cell to transfer, toward the electrolytic cell, water transferred from the accumulator, and the transfer pump includes a casing connecting an inlet and an outlet for water, and an impeller disposed inside the casing, and an upper limit of transfer pressure of water is set to be a predetermined pressure by setting a gap distance between an inner wall of the casing and a front end of the impeller to be a predetermined distance. With this configuration, the occurrence of pulsing to transferred water is further reduced by setting the upper limit of the transfer pressure, and thus instability of water supply can be further reduced.

In these configurations, it is preferable that an impedance meter is further included that measures an impedance of the electrolytic cell, and transfer pressure of water transferred to the electrolytic cell is changed based on the impedance measured by the impedance meter. With this configuration, it is possible to further reduce instability of water supply, suppress degradation of the electrolytic cell, and suppress increase in energy consumption involved in hydrogen and oxygen generation.

In these configurations, it is preferable that a dehumidifier is further included that dehumidifies each generated gas generated by the electrolytic cell. With this configuration, water vapor corresponding to saturated vapor pressure included in generated gas is removed, which can suppress generation of water droplets due to dew condensation when temperature decreases.

Further, in order to solve the above-described problems and achieve the object, a hydrogen-oxygen generation method includes a water storage step of storing water in a water storage chamber by supplying water from a water supply unit to the water storage chamber in which water is stored, the water storage chamber being separated by an elastic body membrane from a gas chamber to which pressurized gas is supplied in an accumulator; a gas pressure adjustment step of adjusting a pressure of pressurized gas in the gas chamber by supplying pressurized gas from a gas supply unit to the gas chamber; and an electrolyzation step of transferring the water stored at the water storage step toward an electrolytic cell at transfer pressure in accordance with the pressure of the pressurized gas adjusted at the gas pressure adjustment step, generating hydrogen and oxygen by electrolyzing, at the electrolytic cell, the water supplied to the electrolytic cell, and discharging the generated hydrogen and oxygen as separate generated gasses.

With this configuration, since the transfer pressure of supplied water is controlled through the water storage step and the gas pressure adjustment step executed at the accumulator, the occurrence of pulsing to transferred water is reduced, which leads to reduction of instability of water supply. In addition, since hydrogen and oxygen are generated by electrolyzing supplied water and discharged as separate generated gasses through the electrolyzation step executed at the electrolytic cell, it is significantly less likely that hydrogen bubbles are accumulated on the surface of a cathode and hydrogen remains in supplied water, and thus a circulation facility and a centrifugal separation facility for supplied water are not needed, which leads to reduction of size increase of the system.

In this configuration, it is preferable that a transfer pressure change step is further included that is of measuring an impedance of the electrolytic cell and changing the transfer pressure based on the measured impedance. With this configuration, it is possible to further reduce instability of water supply, suppress degradation of the electrolytic cell and increase of energy consumption involved in hydrogen and oxygen generation.

DESCRIPTION OF EMBODIMENTS

Embodiments of the present invention will be described below in detail with reference to the accompanying drawings. Note that the present invention is not limited to the embodiments. Components in the embodiments include those that could be easily replaced by the skilled person in the art or those identical in effect. Components described below may be combined as appropriate.

First Embodiment

Figure 1:
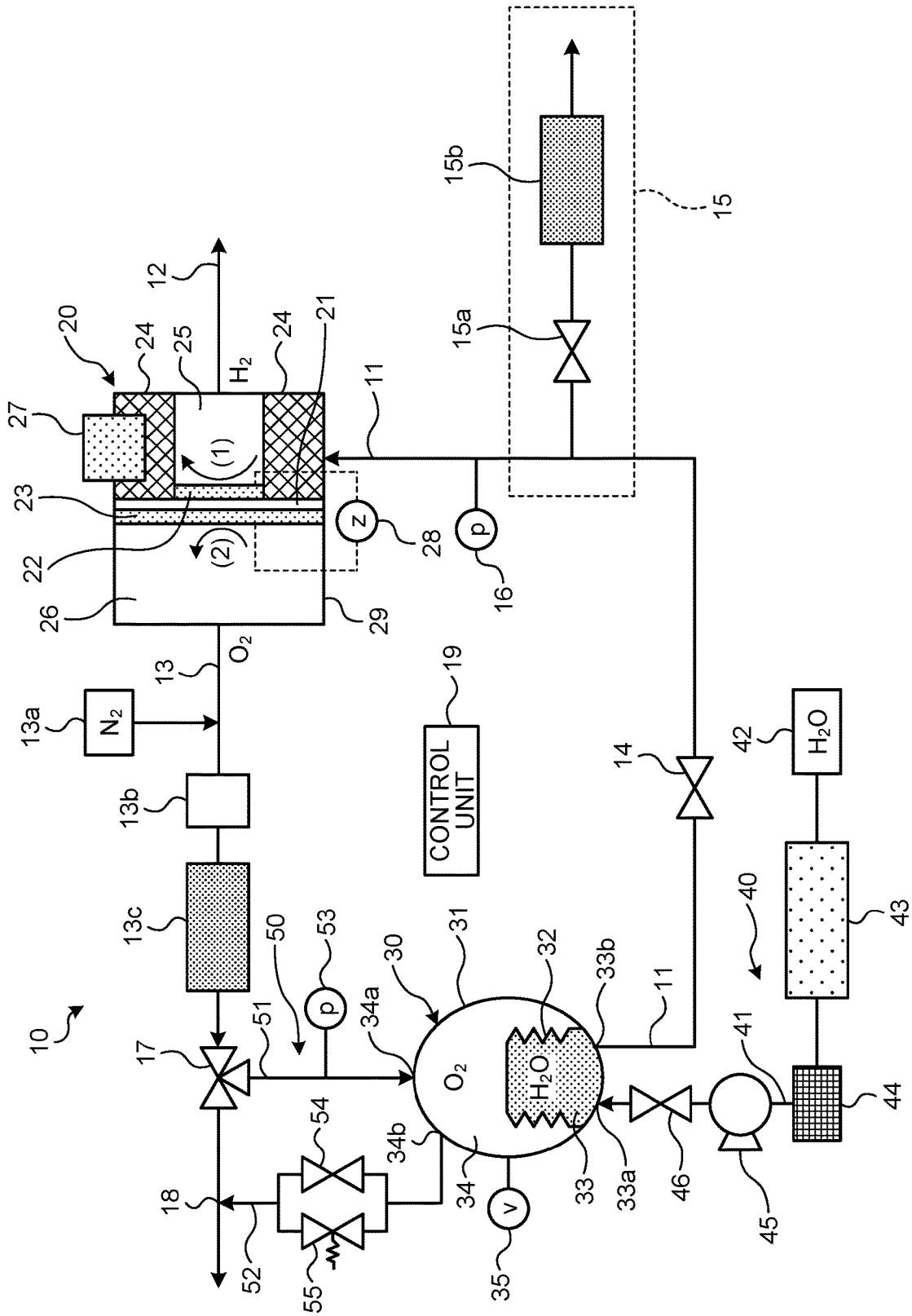
FIG. 1 is a schematic configuration diagram illustrating an exemplary hydrogen-oxygen generation system according to a first embodiment.

FIG. 1 is a schematic configuration diagram illustrating an exemplary hydrogen-oxygen generation system 10 according to a first embodiment. As illustrated in FIG. 1, the hydrogen-oxygen generation system 10 includes an electrolytic cell 20, an accumulator 30, a water supply unit 40, and a gas supply unit 50.

As illustrated in FIG. 1, the electrolytic cell 20 includes a catalyst membrane 21, a first gas diffusion electrode 22, a second gas diffusion electrode 23, a water supply chamber 24, a first generated gas discharge chamber 25, a second generated gas discharge chamber 26, a temperature adjuster 27, and an impedance meter 28.

The catalyst membrane 21 is obtained by forming catalyst containing electrolyte into a membrane shape, water is supplied from the water supply chamber 24 provided in a region in which the first gas diffusion electrode 22 is not provided on one surface of the catalyst membrane 21, the supplied water is electrolyzed in the catalyst to generate hydrogen ($H_2$) and oxygen ($O_2$), and the generated hydrogen and oxygen are discharged as separate generated gasses. The water supply chamber 24 is communicated with a water storage chamber 33 of the accumulator 30 through a water transfer pipe 11 and supplied with water from the water storage chamber 33 of the accumulator 30 through the water transfer pipe 11. Specifically, the water supply chamber 24, which is illustrated as vertically separated parts in FIG. 1, is provided in a loop at an outer peripheral part of the one surface of the catalyst membrane 21, and thus water supplied through the water transfer pipe 11 circulates in the water supply chamber 24, thereby reducing temperature difference between places.

The first gas diffusion electrode 22 is provided at part of the one surface of the catalyst membrane 21, functions as a cathode when water is electrolyzed, and discharges hydrogen that is one of the generated gasses obtained through the electrolyzation toward the first generated gas discharge chamber 25 provided on a side opposite the catalyst membrane 21 through the first gas diffusion electrode 22 while no liquid water is included. The first generated gas discharge chamber 25 is communicated with a gas transfer pipe 12 for hydrogen as first gas, and hydrogen is transferred from the first generated gas discharge chamber 25 toward a discharge destination or a reuse destination through the hydrogen gas transfer pipe 12.

The second gas diffusion electrode 23 is entirely provided on the other surface of the catalyst membrane 21, functions as an anode when water is electrolyzed, and discharges oxygen that is the other of the generated gasses obtained through the electrolyzation toward the second generated gas discharge chamber 26 provided on a side opposite the catalyst membrane 21 through the second gas diffusion electrode 23 while no liquid water is included. The second generated gas discharge chamber 26 is communicated with a gas transfer pipe 13 for oxygen as second gas, and oxygen is transferred from the second generated gas discharge chamber 26 toward a discharge destination or a reuse destination through the oxygen gas transfer pipe 13.

In the catalyst membrane 21, hydrogen is generated in a region indicated by (1) in FIG. 1 on a side closer to the first gas diffusion electrode 22, which functions as the cathode, based on an electrolysis reaction according to Expression (1) below. In addition, in the catalyst membrane 21, hydrogen is generated in a region indicated by (2) in FIG. 1 on a side closer to the second gas diffusion electrode 23, which functions as the anode, based on an electrolysis reaction according to Expression (2) below.

$$2H^+ + 2e^- \longrightarrow H_2 \quad (1)$$

$$H_2O \longrightarrow (1/2)O_2 + 2H^+ + 2e^- \quad (2)$$

The temperature adjuster 27 is directed toward the water supply chamber 24, can adjust the temperature of water supplied to the water supply chamber 24 through a housing 29 of the electrolytic cell 20, which forms the water supply chamber 24, the first generated gas discharge chamber 25, and the second generated gas discharge chamber 26, and accordingly, can reduce temperature difference between places. The temperature adjuster 27 is, for example, a Peltier chiller or heater, but a combination of other heater and cooler may be used as appropriate. Note that the temperature adjuster 27 may be omitted or minimized when the electrolytic cell 20 operates under a condition that endothermic energy of water electrolyzation and exothermic energy generated at water electrolyzation are balanced with each other.

The electrolytic cell 20 is provided with holes (not illustrated) into each of which a thermocouple 20a (refer to FIG. 2) configured to measure temperature is inserted at places. Thus, the electrolytic cell 20 can measure the temperature of each component in real time. Information of the measured temperature of each component is used as appropriate when the temperature of water supplied to the water supply chamber 24 is adjusted by the temperature adjuster 27.

The impedance meter 28 is provided for the catalyst membrane 21 of the electrolytic cell 20 and can measure the impedance of the catalyst membrane 21 of the electrolytic cell 20. The impedance meter 28 can indirectly measure the water content in the catalyst membrane 21 since the catalyst membrane 21 has a property that the impedance thereof increases as the supplied water content decreases.

The water transfer pipe 11 is communicated with the water supply chamber 24 of the electrolytic cell 20 and the water storage chamber 33 of the accumulator 30 and transfers and supplies water from the water storage chamber 33 of the accumulator 30 toward the water supply chamber 24 of the electrolytic cell 20. As illustrated in FIG. 1, the water transfer pipe 11 is provided with a flow rate adjustment valve 14, a vacuum discharge line 15, and a pressure meter 16.

The flow rate adjustment valve 14 switches the opened-closed state of the inside of the water transfer pipe 11, thereby switching a state in which water is transferred through the water transfer pipe 11 and a state in which the water transfer is stopped. The flow rate adjustment valve 14 also changes the opening degree of the flow rate adjustment valve 14 inside the water transfer pipe 11, thereby changing pressure at which water is transferred through the water transfer pipe 11.

The vacuum discharge line 15 is bifurcated from the water transfer pipe 11, provided with a discharge valve 15a capable of switching whether to allow communication with the water transfer pipe 11, and a dehumidifier 15b configured to perform dehumidification by removing water vapor from gas passing inside, and used for, for example, vacuum filling of the inside of the device with water at initial activation, vacuum cleaning of the inside of the water transfer pipe 11 while water electrolyzation is stopped, and the like. The dehumidifier 15b is, for example, a drag pump configured to capture water droplets at an internal rotational unit, or a housing filled with absorbent that captures water droplets. The pressure meter 16 measures water pressure or atmospheric pressure inside the water transfer pipe 11.

As illustrated in FIG. 1, the hydrogen gas transfer pipe 12 is provided so as to communicate with the first generated gas discharge chamber 25 and transfer hydrogen generated through water electrolyzation in the catalyst membrane 21. The hydrogen gas transfer pipe 12 is communicated with the discharge destination or reuse destination of hydrogen. The hydrogen gas transfer pipe 12 may be provided with a dehumidifier (not illustrated) configured to perform dehumidification by removing water vapor from generated gas mainly made of hydrogen and passing inside. Similarly to the dehumidifier 15b described above, the dehumidifier provided to the hydrogen gas transfer pipe 12 is, for example, a drag pump or a housing filled with absorbent.

As illustrated in FIG. 1, the oxygen gas transfer pipe 13 is communicated with the second generated gas discharge chamber 26 and transfers oxygen generated through water electrolyzation in the catalyst membrane 21. The oxygen gas transfer pipe 13 is communicated with the discharge destination or reuse destination of oxygen. The oxygen gas transfer pipe 13 is provided to, for example, discharge generated oxygen toward a cabin when the hydrogen-oxygen generation system 10 is used in cosmic space. The oxygen gas transfer pipe 13 is provided with a nitrogen gas supply unit 13a, a hydrogen sensor 13b, a dehumidifier 13c, a pressurized gas supply adjustment valve 17, and a pressurized gas discharge unit 18.

The nitrogen gas supply unit 13a can switch whether to allow communication between a nitrogen gas source that supplies nitrogen ($N_2$) and the oxygen gas transfer pipe 13, thereby switching a state in which nitrogen gas is supplied to the oxygen gas transfer pipe 13 and a state in which the nitrogen gas supply is stopped. The nitrogen gas supply unit 13a supplies nitrogen gas to the oxygen gas transfer pipe 13 to suppress a combustion reaction that would occur between oxygen and hydrogen at emergency, for example, when the hydrogen concentration of generated gas mainly made of oxygen and passing inside the oxygen gas transfer pipe 13 is higher than a threshold value.

The hydrogen sensor 13b measures the hydrogen concentration of generated gas mainly made of oxygen and passing inside the oxygen gas transfer pipe 13 by sensing hydrogen included in the generated gas. The dehumidifier 13c performs dehumidification by removing water vapor from generated gas mainly made of oxygen and passing inside the oxygen gas transfer pipe 13, and is, for example, a drag pump or a housing filled with absorbent.

In the first embodiment, the hydrogen-oxygen generation system 10 has a configuration in which the gas supply unit 50 supplies oxygen generated by electrolyzing water at the electrolytic cell 20 to a gas chamber 34 of the accumulator 30 as pressurized gas. Thus, in the first embodiment, the oxygen gas transfer pipe 13 is connected with a gas supply pipe 51 of the gas supply unit 50 through the pressurized gas supply adjustment valve 17 and is connected with a gas discharge pipe 52 of the gas supply unit 50 through the pressurized gas discharge unit 18.

The pressurized gas supply adjustment valve 17 switches the opened-closed state of the inside of the oxygen gas transfer pipe 13, thereby switching a state in which generated gas mainly made of oxygen is transferred through the oxygen gas transfer pipe 13 and a state in which the transfer of generated gas mainly made of oxygen is stopped. The pressurized gas supply adjustment valve 17 can also switch whether to allow communication between the oxygen gas transfer pipe 13 and the gas supply pipe 51, thereby switching a state in which generated gas mainly made of oxygen is supplied as pressurized gas from the oxygen gas transfer pipe 13 to the gas supply pipe 51 and a state in which the supply of generated gas mainly made of oxygen is stopped. In addition, the pressurized gas supply adjustment valve 17 changes the opening degree of the pressurized gas supply adjustment valve 17 from the oxygen gas transfer pipe 13 toward the gas supply pipe 51, thereby changing pressure at which generated gas mainly made of oxygen is transferred from the oxygen gas transfer pipe 13 toward the gas supply pipe 51.

The pressurized gas discharge unit 18 is provided downstream of the pressurized gas supply adjustment valve 17 on the oxygen gas transfer pipe 13 and merges pressurized gas into the oxygen gas transfer pipe 13, the pressurized gas being generated gas mainly made of oxygen and discharged from the gas discharge pipe 52.

Note that, in the first embodiment, the hydrogen-oxygen generation system 10 has a configuration in which the gas supply unit 50 supplies oxygen generated by electrolyzing water at the electrolytic cell 20 to the gas chamber 34 of the accumulator 30 as pressurized gas, but the present invention is not limited thereto, and the gas supply unit 50 may supply hydrogen generated by electrolyzing water at the electrolytic cell 20 to the gas chamber 34 of the accumulator 30 as pressurized gas. In this case, instead of the oxygen gas transfer pipe 13, the hydrogen gas transfer pipe 12 is connected with the gas supply pipe 51 and the gas discharge pipe 52 of the gas supply unit 50. When the gas supply unit 50 supplies hydrogen generated by electrolyzing water at the electrolytic cell 20 to the gas chamber 34 of the accumulator 30 as pressurized gas, the hydrogen produces a reducing atmosphere, and thus oxidation of each pipe of the gas supply unit 50 and the gas chamber 34 of the accumulator 30 can be suppressed.

As illustrated in FIG. 1, the accumulator 30 includes an ellipsoidal body 31 and an elastic body membrane 32. The accumulator 30 also includes, in an internal space of the body 31, the water storage chamber 33 and the gas chamber 34 separated from each other by the elastic body membrane 32, and a water volume sensor 35.

The water storage chamber 33 is a space in which water is stored, and the body 31 of the accumulator 30 is provided with an inlet 33a through which water to be stored is supplied and an outlet 33b through which stored water is transferred. The gas chamber 34 is a space to which pressurized gas is supplied, and the body 31 of the accumulator 30 is provided with an inlet 34a through which pressurized gas is supplied and an outlet 34b through which supplied pressurized gas is discharged. The accumulator 30 transfers water stored in the water storage chamber 33 toward the electrolytic cell 20 at transfer pressure in accordance with the pressure of pressurized gas in the gas chamber 34.

The water storage chamber 33 is connected with a water supply pipe 41 of the water supply unit 40 at the inlet 33a and supplied with water from the water supply unit 40. The water storage chamber 33 is communicated with the water supply chamber 24 of the electrolytic cell 20 through the water transfer pipe 11 at the outlet 33b and transfers and supplies water to the water supply chamber 24 of the electrolytic cell 20 through the water transfer pipe 11.

The gas chamber 34 is communicated with the oxygen gas transfer pipe 13 through the gas supply pipe 51 of the gas supply unit 50 at the inlet 34a, and generated gas mainly made of oxygen and passing through the oxygen gas transfer pipe 13 is supplied as pressurized gas from the oxygen gas transfer pipe 13 through the gas supply pipe 51. The gas chamber 34 is communicated with the oxygen gas transfer pipe 13 through the gas discharge pipe 52 of the gas supply unit 50 at the outlet 34b and discharges pressurized gas to the oxygen gas transfer pipe 13 through the gas discharge pipe 52.

The volume of the water storage chamber 33 and the volume of the gas chamber 34 change as the elastic body membrane 32 expands and contracts in accordance with the stored amount of water supplied to the water storage chamber 33 and the cumulated amount of pressurized gas supplied to the gas chamber 34. The water volume sensor 35 is provided to the body 31 of the accumulator 30 and detects the volume of the water storage chamber 33 that changes as the elastic body membrane 32 expands and contracts, thereby detecting the volume of water stored in the water storage chamber 33.

As illustrated in FIG. 1, the water supply unit 40 includes the water supply pipe 41, a water supply source 42, a demineralizer 43, a filter 44, a pump 45, and a water supply valve 46 and supplies water to the water storage chamber 33. The water supply pipe 41 is communicated with the water supply source 42 and the inlet 33a of the water storage chamber 33 of the accumulator 30. The water supply pipe 41 is provided with the demineralizer 43, the filter 44, the pump 45, and the water supply valve 46, sequentially from the water supply source 42 toward the inlet 33a.

The demineralizer 43 removes salt included in water supplied from the water supply source 42, thereby increasing the purity of the water to reduce a salt decomposing reaction at the electrolytic cell 20. The filter 44 removes impurities and the like included in water supplied from the water supply source 42, thereby increasing the purity of the water. The power of the pump 45 is switched on and off to switch a state in which water is transferred from the water supply source 42 toward the inlet 33a of the water storage chamber 33 of the accumulator 30 and a state in which the water transfer is stopped. The water supply valve 46 switches the opened-closed state of the inside of the water supply pipe 41, thereby switching a state in which water is supplied from the water supply source 42 to the inlet 33a of the water storage chamber 33 of the accumulator 30 through the water supply pipe 41 and a state in which the water supply is stopped.

As illustrated in FIG. 1, the gas supply unit 50 includes the gas supply pipe 51, the gas discharge pipe 52, a pressure meter 53, a discharge valve 54, and a relief valve 55 and supplies pressurized gas to the gas chamber 34. In the gas supply unit 50, the gas supply pipe 51 is connected with the oxygen gas transfer pipe 13 through the pressurized gas supply adjustment valve 17, and the gas discharge pipe 52 is connected with the oxygen gas transfer pipe 13 through the pressurized gas discharge unit 18.

The gas supply pipe 51 is communicated with the oxygen gas transfer pipe 13 and the inlet 34a of the gas chamber 34 of the accumulator 30. The pressure meter 53 is provided to the gas supply pipe 51 and measures atmospheric pressure inside the gas supply pipe 51, in other words, the pressure of pressurized gas in the gas chamber 34 of the accumulator 30.

The gas discharge pipe 52 is communicated with the oxygen gas transfer pipe 13 and the outlet 34b of the gas chamber 34 of the accumulator 30. The discharge valve 54 and the relief valve 55 are provided to the gas discharge pipe 52 in parallel. The discharge valve 54 switches the opened-closed state of the inside of the gas discharge pipe 52, thereby switching a state in which pressurized gas is discharged through the gas discharge pipe 52 and a state in which the pressurized gas discharge is stopped. The relief valve 55 is a valve configured to automatically relieve pressure when excessive pressure occurs inside the gas discharge pipe 52 on a side closer to the outlet 34b of the gas chamber 34 of the accumulator 30, thereby preventing excessive pressure in the gas chamber 34.

As illustrated in FIG. 1, the hydrogen-oxygen generation system 10 includes a control unit 19 configured to control each above-described component included in the hydrogen-oxygen generation system 10. Specifically, the control unit 19 causes the hydrogen-oxygen generation system 10 to execute a hydrogen-oxygen generation method according to the first embodiment of the present invention. The control unit 19 is a computer that includes an arithmetic processing device including a microprocessor such as a central processing unit (CPU), a storage device including memories such as a read only memory (ROM) and a random access memory (RAM), and an input-output interface device, and that is capable of executing computer programs. Each function of the control unit 19 is achieved when the arithmetic processing device executes, on the RAM, a computer program stored in the ROM and stores a result of the execution and the like in the storage device.

Figure 2:
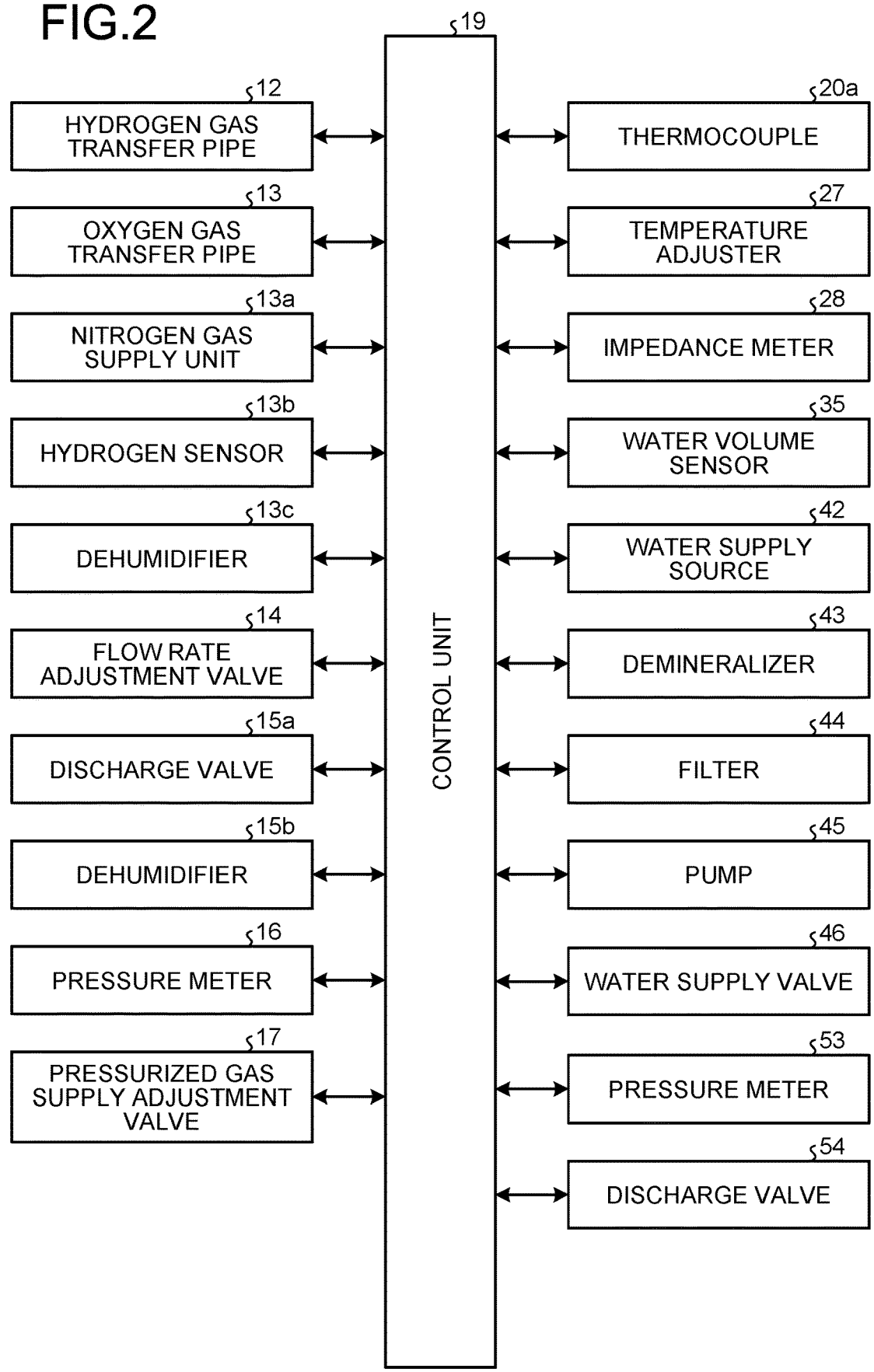
FIG. 2 is a control block diagram of the hydrogen-oxygen generation system in FIG. 1.

FIG. 2 is a control block diagram of the hydrogen-oxygen generation system 10 in FIG. 1. As illustrated in FIG. 2, the control unit 19 is electrically connected with each of the hydrogen gas transfer pipe 12, the oxygen gas transfer pipe 13, the nitrogen gas supply unit 13a, the hydrogen sensor 13b, the dehumidifier 13c, the flow rate adjustment valve 14, the discharge valve 15a, the dehumidifier 15b, the pressure meter 16, the pressurized gas supply adjustment valve 17, the thermocouples 20a attached at places on the electrolytic cell 20, the temperature adjuster 27, the impedance meter 28, the water volume sensor 35, the water supply source 42, the demineralizer 43, the filter 44, the pump 45, the water supply valve 46, the pressure meter 53, and the discharge valve 54 to perform information communication therewith.

The control unit 19 controls a meter such as a pressure meter provided in connection with the hydrogen gas transfer pipe 12 and acquires information such as the pressure and volume of generated hydrogen from the meter. The control unit 19 controls a meter such as a pressure meter provided in connection with the oxygen gas transfer pipe 13 and acquires information such as the pressure and volume of generated oxygen from the meter.

The control unit 19 controls the hydrogen sensor 13b and acquires, from the hydrogen sensor 13b, information of the hydrogen concentration of generated gas mainly made of oxygen and passing inside the oxygen gas transfer pipe 13. The control unit 19 controls the nitrogen gas supply unit 13a based on the hydrogen concentration information acquired from the hydrogen sensor 13b, and to suppress a combustion reaction that would occur between oxygen and hydrogen at emergency, for example, when the hydrogen concentration is higher than a threshold value, the control unit 19 causes the nitrogen gas supply unit 13a to supply nitrogen gas to the oxygen gas transfer pipe 13 and acquires information related to the nitrogen gas supply from the nitrogen gas supply unit 13a.

When a drag pump configured to capture water droplets at an internal rotational unit is used as the dehumidifier 13c, the control unit 19 controls the dehumidifier 13c to control the amount of water droplets captured at the internal rotational unit by the dehumidifier 13c and acquires, from the dehumidifier 13c, information related to the amount of captured water droplets. When a housing filled with absorbent that captures water droplets is used as the dehumidifier 13c, the control unit 19 acquires, from the dehumidifier 13c, information related to the amount of water droplets captured by the dehumidifier 13c. For the dehumidifier 15b, the control unit 19 performs control same as that on the dehumidifier 13c and acquires information same as that from the dehumidifier 13c.

The control unit 19 controls the pressure meter 16 and acquires, from the pressure meter 16, information of the transfer pressure of water inside the water transfer pipe 11. The control unit 19 controls the flow rate adjustment valve 14 based on the water transfer pressure information acquired from the pressure meter 16 and switches the opened-closed state of the flow rate adjustment valve 14, thereby switching the state of water transfer through the water transfer pipe 11, and acquires, from the flow rate adjustment valve 14, information related to the opened-closed state of the flow rate adjustment valve 14, thereby acquiring information related to the water transfer through the water transfer pipe 11. In addition, the control unit 19 controls the flow rate adjustment valve 14 to change the opening degree of the flow rate adjustment valve 14 inside the water transfer pipe 11, thereby changing the transfer pressure of water through the water transfer pipe 11.

The control unit 19 controls the discharge valve 15a to switch whether to allow communication through the vacuum discharge line 15 and acquires, from the discharge valve 15a, information of communication through the vacuum discharge line 15. When the discharge valve 15a is switched to allow communication through the vacuum discharge line 15, the control unit 19 controls the dehumidifier 15b or acquires information from the dehumidifier 15b.

The control unit 19 controls the thermocouples 20a attached at places on the electrolytic cell 20 and acquires, from each thermocouple 20a, information of the temperature of the corresponding component of the electrolytic cell 20. The control unit 19 controls the temperature adjuster 27 based on the information of the temperature of each component of the electrolytic cell 20 acquired from the corresponding thermocouple 20a, controls adjustment of the temperature of water supplied to the water supply chamber 24, and acquires information related to the water temperature adjustment from the temperature adjuster 27.

The control unit 19 controls the pressure meter 53 and acquires, from the pressure meter 53, information of atmospheric pressure inside the gas supply pipe 51, in other words, information of the pressure of pressurized gas in the gas chamber 34 of the accumulator 30. The control unit 19 controls the pressurized gas supply adjustment valve 17 and the discharge valve 54 based on the information of the pressure of pressurized gas in the gas chamber 34 of the accumulator 30, which is acquired from the pressure meter 53, thereby controlling the pressure of pressurized gas in the gas chamber 34 of the accumulator 30.

Specifically, the control unit 19 controls the pressurized gas supply adjustment valve 17 based on the information of the pressure of pressurized gas in the gas chamber 34 of the accumulator 30, which is acquired from the pressure meter 53, to switch communication between the oxygen gas transfer pipe 13 and the gas supply pipe 51, thereby switching the state of supply of generated gas mainly made of oxygen as pressurized gas from the oxygen gas transfer pipe 13 to the gas supply pipe 51, and acquires, from the pressurized gas supply adjustment valve 17, information related to whether to allow communication between the oxygen gas transfer pipe 13 and the gas supply pipe 51, thereby acquiring information related to the pressurized gas supply. In addition, the control unit 19 controls the pressurized gas supply adjustment valve 17 to change the opening degree of the pressurized gas supply adjustment valve 17 from the oxygen gas transfer pipe 13 toward the gas supply pipe 51, thereby changing the transfer pressure of generated gas mainly made of oxygen from the oxygen gas transfer pipe 13 toward the gas supply pipe 51.

The control unit 19 controls the discharge valve 54 based on the information of the pressure of pressurized gas in the gas chamber 34 of the accumulator 30, which is acquired from the pressure meter 53, to switch the opened-closed state of the discharge valve 54, thereby switching the state of pressurized gas discharge through the gas discharge pipe 52, and acquires, from the discharge valve 54, information related to the opened-closed state of the discharge valve 54, thereby acquiring information related to the pressurized gas discharge through the gas discharge pipe 52.

The control unit 19 controls the pressurized gas supply adjustment valve 17 to switch the opened-closed state of the pressurized gas supply adjustment valve 17 inside the oxygen gas transfer pipe 13, thereby switching the state of transfer of generated gas mainly made of oxygen through the oxygen gas transfer pipe 13, and acquires, from the pressurized gas supply adjustment valve 17, information related to the opened-closed state of the pressurized gas supply adjustment valve 17 inside the oxygen gas transfer pipe 13, thereby acquiring information related to the transfer of generated gas mainly made of oxygen through the oxygen gas transfer pipe 13.

The control unit 19 controls the water volume sensor 35 and acquires, from the water volume sensor 35, information of the volume of water stored in the water storage chamber 33 of the accumulator 30. The control unit 19 controls the pump 45 and the water supply valve 46 based on the information of the volume of water stored in the water storage chamber 33 of the accumulator 30, which is acquired from the water volume sensor 35, to control the amount of water supply from the water supply source 42 to the water storage chamber 33, thereby controlling the volume of water stored in the water storage chamber 33 of the accumulator 30.

Specifically, the control unit 19 controls the pump 45 based on the information of the volume of water stored in the water storage chamber 33 of the accumulator 30, which is acquired from the water volume sensor 35, to switch the on-off state of the power of the pump 45, thereby switching the state of water transfer from the water supply source 42 toward the inlet 33a of the water storage chamber 33 of the accumulator 30, and acquires, from the pump 45, information related to the on-off state of the power of the pump 45, thereby acquiring information related to the state of the water transfer.

The control unit 19 controls the water supply valve 46 based on the information of the volume of water stored in the water storage chamber 33 of the accumulator 30, which is acquired from the water volume sensor 35, to switch the opened-closed state of the water supply valve 46, thereby switching the state of water supply from the water supply source 42 to the inlet 33a of the water storage chamber 33 of the accumulator 30 through the water supply pipe 41, and acquires, from the water supply valve 46, information related to the opened-closed state of the water supply valve 46, thereby acquiring information related to the state of the water supply.

The control unit 19 controls the impedance meter 28 and acquires information of the impedance of the catalyst membrane 21 from the impedance meter 28. The control unit 19 changes the transfer pressure of water transferred to the electrolytic cell 20 based on the information of the impedance of the catalyst membrane 21, which is acquired from the impedance meter 28.

The control unit 19 acquires information related to, for example, the amount of water that can be supplied from the water supply source 42. The control unit 19 acquires information related to salt, such as the amount of salt captured and removed by the demineralizer 43. The control unit 19 acquires information of the amount of impurities and the like captured and removed by the filter 44.

Figure 3:
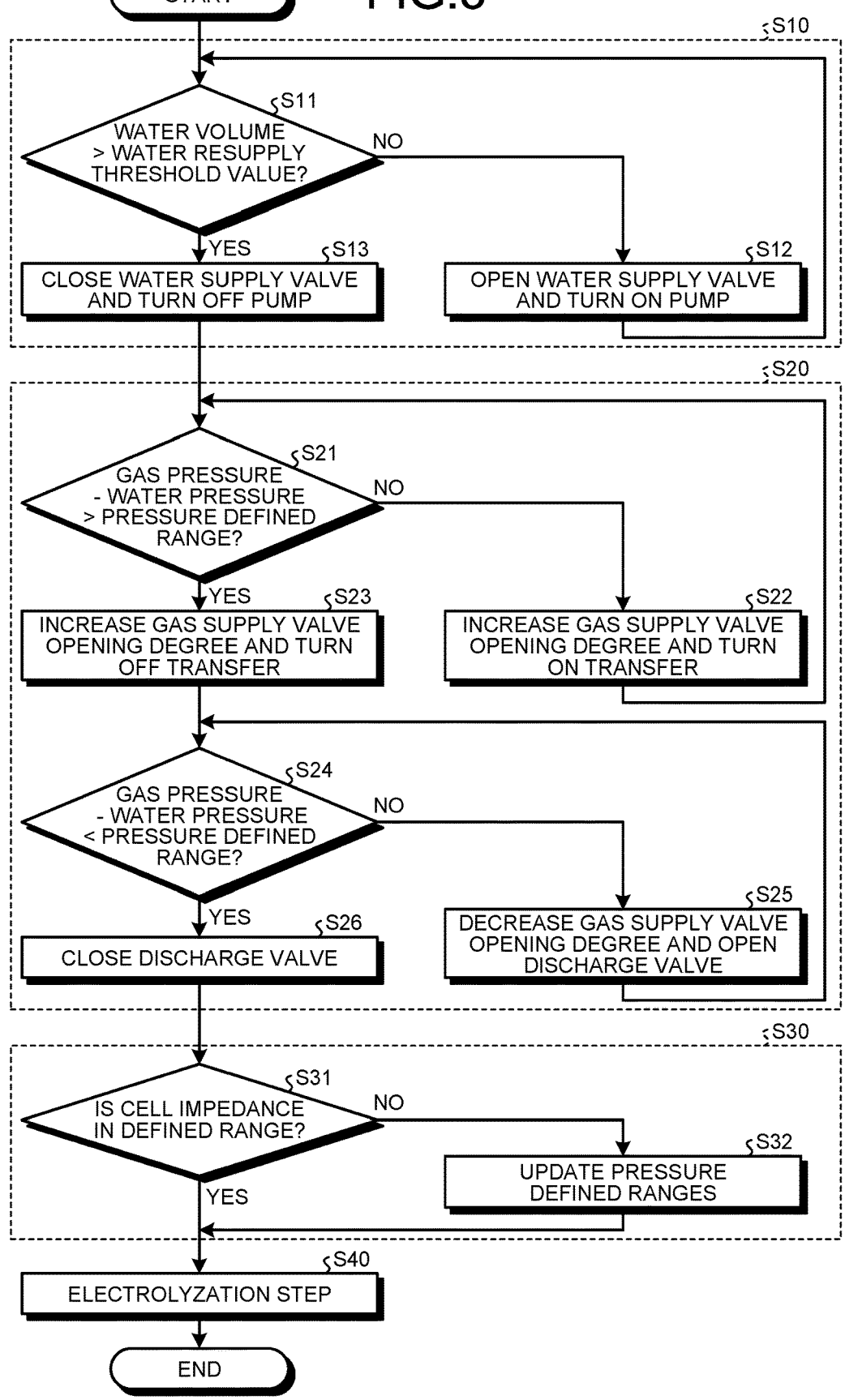
FIG. 3 is a flowchart illustrating an exemplary process of a hydrogen-oxygen generation method according to the first embodiment.

Effects of the hydrogen-oxygen generation system 10 according to the first embodiment of the present invention will be described below. FIG. 3 is a flowchart illustrating an exemplary process of the hydrogen-oxygen generation method according to the first embodiment. The hydrogen-oxygen generation method according to the first embodiment of the present invention, which is a processing method executed by the hydrogen-oxygen generation system 10, will be described with reference to FIG. 3. The hydrogen-oxygen generation method according to the first embodiment of the present invention includes a water storage step S10, a gas pressure adjustment step S20, a transfer pressure change step S30, and an electrolyzation step S40.

The water storage step S10 is a step of storing water in the water storage chamber 33 by supplying water from the water supply unit 40 to the water storage chamber 33 in which water is stored and that is separated through the elastic body membrane 32 from the gas chamber 34 to which pressurized gas is supplied in the accumulator 30. As illustrated in FIG. 3, the water storage step S10 includes a water volume detection step S11, a water supply step S12, and a water supply stop step S13.

The water volume detection step S11 is a step at which the control unit 19 controls the water volume sensor 35 to detect the volume of water stored in the water storage chamber 33 of the accumulator 30 and determines whether the water volume has reached a predetermined water resupply threshold value. The water volume detection step S11 is repeatedly executed as appropriate until the control unit 19 ends the water storage step S10.

The water supply step S12 is a step at which, in a case of No at the water volume detection step S11, in other words, when the control unit 19 determines that the water volume has not reached the predetermined water resupply threshold value, the water supply valve 46 is controlled to be opened and the pump 45 is controlled to be turned on so that water is supplied from the water supply source 42 to the water storage chamber 33.

The water supply stop step S13 is a step at which, in a case of Yes at the water volume detection step S11, in other words, when the control unit 19 determines that the water volume has reached the predetermined water resupply threshold value, the water supply valve 46 is controlled to be closed and the pump 45 is controlled to be turned off so that the water supply from the water supply source 42 to the water storage chamber 33 is stopped.

Lastly at the water storage step S10, the control unit 19 acquires, from the water volume sensor 35, the volume of water stored in the water storage chamber 33 of the accumulator 30 in this case, and calculates the pressure of water stored in the water storage chamber 33 of the accumulator 30 based on the acquired volume. When having ended the water storage step S10, namely, the water volume detection step S11, the water supply step S12, and the water supply stop step S13, the hydrogen-oxygen generation method according to the first embodiment of the present invention proceeds to the gas pressure adjustment step S20.

The gas pressure adjustment step S20 is a step of adjusting the pressure of pressurized gas in the gas chamber 34 by supplying pressurized gas from the gas supply unit 50 to the gas chamber 34. As illustrated in FIG. 3, the gas pressure adjustment step S20 includes a first pressurized gas pressure detection step S21, a pressurized gas supply step S22, a pressurized gas supply stop step S23, a second pressurized gas pressure detection step S24, a pressurized gas discharge step S25, and a pressurized gas discharge stop step S26.

The first pressurized gas pressure detection step S21 is a step at which the control unit 19 controls the pressure meter 53 to measure atmospheric pressure inside the gas supply pipe 51, in other words, the pressure of pressurized gas in the gas chamber 34 of the accumulator 30 and determines whether the pressure of the pressurized gas has reached a first predetermined pressure defined range compared to the pressure of water stored in the water storage chamber 33 of the accumulator 30. At the first pressurized gas pressure detection step S21, the control unit 19 determines whether a value obtained by subtracting the pressure of the water from the pressure of the pressurized gas is larger than the first predetermined pressure defined range. The first pressurized gas pressure detection step S21 is repeatedly executed as appropriate until the control unit 19 ends the pressurized gas supply stop step S23 in the gas pressure adjustment step S20.

The pressurized gas supply step S22 is a step at which, in a case of No at the first pressurized gas pressure detection step S21, in other words, when the control unit 19 determines that the pressure of the pressurized gas has not reached the first predetermined pressure defined range compared to the pressure of the water, the pressurized gas supply adjustment valve 17 is controlled to allow communication between the oxygen gas transfer pipe 13 and the gas supply pipe 51, thereby supplying, as pressurized gas, generated gas mainly made of oxygen from the oxygen gas transfer pipe 13 to the gas supply pipe 51. At the pressurized gas supply step S22, in place of or in addition to this supply, the control unit 19 may control the pressurized gas supply adjustment valve 17 to change in a direction in which the opening degree of the pressurized gas supply adjustment valve 17 from the oxygen gas transfer pipe 13 toward the gas supply pipe 51 increases, thereby changing the transfer pressure of generated gas mainly made of oxygen from the oxygen gas transfer pipe 13 toward the gas supply pipe 51.

Note that, at the pressurized gas supply step S22, the control unit 19 may decrease the pressure of the water instead of increasing the pressure of the pressurized gas, and for example, may control the flow rate adjustment valve 14 to open the flow rate adjustment valve 14 or change in a direction in which the opening degree of the flow rate adjustment valve 14 increases, thereby transferring water toward the electrolytic cell 20 through the water transfer pipe 11. In this case, at the pressurized gas supply step S22, the control unit 19 recalculates the pressure of water stored in the water storage chamber 33 of the accumulator 30.

The pressurized gas supply stop step S23 is a step at which, in a case of Yes at the first pressurized gas pressure detection step S21, in other words, when the control unit 19 determines that the pressure of the pressurized gas has reached the first predetermined pressure defined range compared to the pressure of the water, the pressurized gas supply adjustment valve 17 is controlled to change in a direction in which the opening degree of the pressurized gas supply adjustment valve 17 from the oxygen gas transfer pipe 13 toward the gas supply pipe 51 decreases, thereby transitioning, to a stationary state, the transfer pressure of generated gas mainly made of oxygen from the oxygen gas transfer pipe 13 toward the gas supply pipe 51.

Note that, at the pressurized gas supply stop step S23, when the control unit 19 decreases the pressure of the water at the pressurized gas supply step S22 instead of increasing the pressure of pressurized gas, the flow rate adjustment valve 14 may be controlled, oppositely to the pressurized gas supply step S22, to close the flow rate adjustment valve 14 or change in a direction in which the opening degree of the flow rate adjustment valve 14 decreases, thereby transitioning, to a stationary state, water transfer toward the electrolytic cell 20 through the water transfer pipe 11. In this case as well, at the pressurized gas supply stop step S23, the control unit 19 recalculates the pressure of water stored in the water storage chamber 33 of the accumulator 30.

The second pressurized gas pressure detection step S24 is a step at which the control unit 19 controls the pressure meter 53 to measure atmospheric pressure inside the gas supply pipe 51, in other words, the pressure of pressurized gas in the gas chamber 34 of the accumulator 30 and determines whether the pressure of the pressurized gas is in a second predetermined pressure defined range compared to the pressure of water stored in the water storage chamber 33 of the accumulator 30. At the second pressurized gas pressure detection step S24, the control unit 19 determines whether a value obtained by subtracting the pressure of the water from the pressure of the pressurized gas is smaller than the second predetermined pressure defined range. The second pressurized gas pressure detection step S24 is repeatedly executed as appropriate until the control unit 19 ends the pressurized gas discharge stop step S26 in the gas pressure adjustment step S20.

The pressurized gas discharge step S25 is a step at which, in a case of No at the second pressurized gas pressure detection step S24, in other words, when the control unit 19 determines that the pressure of the pressurized gas is out of the second predetermined pressure defined range compared to the pressure of the water, the discharge valve 54 is controlled to open the discharge valve 54, thereby discharging pressurized gas through the gas discharge pipe 52. At the pressurized gas discharge step S25, in place of or in addition to this discharge, the control unit 19 controls the pressurized gas supply adjustment valve 17 to change in a direction in which the opening degree of the pressurized gas supply adjustment valve 17 from the oxygen gas transfer pipe 13 toward the gas supply pipe 51 decreases, thereby changing the transfer pressure of generated gas mainly made of oxygen from the oxygen gas transfer pipe 13 toward the gas supply pipe 51.

The pressurized gas discharge stop step S26 is a step at which, in a case of Yes at the second pressurized gas pressure detection step S24, in other words, when the control unit 19 determines that the pressure of the pressurized gas is in the second predetermined pressure defined range compared to the pressure of the water, the discharge valve 54 is controlled to close the discharge valve 54, thereby stopping pressurized gas discharge through the gas discharge pipe 52.

The hydrogen-oxygen generation method according to the first embodiment of the present invention executes the water storage step S10 and the gas pressure adjustment step S20 to form a state in which water stored in the water storage chamber 33 of the accumulator 30 can be stationarily transferred toward the electrolytic cell 20 at transfer pressure in accordance with the pressure of pressurized gas in the gas chamber 34 of the accumulator 30. Thus, when the control unit 19 stationarily transfers water toward the electrolytic cell 20, it is preferable that the hydrogen-oxygen generation method according to the first embodiment of the present invention repeatedly executes the water storage step S10 and the gas pressure adjustment step S20 as appropriate, thereby controlling the transfer pressure of water into a desired range.

When having ended the gas pressure adjustment step S20, namely, the first pressurized gas pressure detection step S21, the pressurized gas supply step S22, the pressurized gas supply stop step S23, the second pressurized gas pressure detection step S24, the pressurized gas discharge step S25, and the pressurized gas discharge stop step S26, the hydrogen-oxygen generation method according to the first embodiment of the present invention proceeds to the transfer pressure change step S30.

The transfer pressure change step S30 is a step of measuring the impedance of the electrolytic cell 20 and changing the transfer pressure of water based on the measured impedance. As illustrated in FIG. 3, the transfer pressure change step S30 includes an impedance determination step S31 and a pressure defined range update step S32.

The impedance determination step S31 is a step at which the control unit 19 controls the impedance meter 28 to measure the catalyst membrane 21 of the impedance of the electrolytic cell 20 and determines whether the impedance of the catalyst membrane 21 is in a predetermined defined range.

The pressure defined range update step S32 is a step at which, in a case of No at the impedance determination step S31, in other words, when the control unit 19 determines that the impedance of the catalyst membrane 21 is out of the predetermined defined range, setting of the transfer pressure of water transferred to the electrolytic cell 20 is changed, and accordingly, a set value (predetermined water resupply threshold value) of the volume of water stored in the water storage chamber 33 of the accumulator 30 and values (first and second predetermined pressure defined ranges) related to setting of the pressure of pressurized gas in the gas chamber 34 of the accumulator 30 are changed.

At the pressure defined range update step S32, when the control unit 19 determines that the impedance of the catalyst membrane 21 is out of the predetermined defined range on the higher side, it is determined that the water content in the catalyst membrane 21 of the electrolytic cell 20 is preferably increased, and setting of the transfer pressure of water transferred to the electrolytic cell 20 is changed in a direction in which the transfer pressure decreases. At the pressure defined range update step S32, when the control unit 19 determines that the impedance of the catalyst membrane 21 is out of the predetermined defined range on the lower side, it is determined that the water content in the catalyst membrane 21 of the electrolytic cell 20 is preferably decreased, and setting of the transfer pressure of water transferred to the electrolytic cell 20 is changed in a direction in which the transfer pressure increases.

Note that the transfer pressure change step S30 is not essential in the hydrogen-oxygen generation method according to the first embodiment of the present invention and may be skipped. In addition, when setting of the transfer pressure of water transferred to the electrolytic cell 20 is changed as a result of execution of the transfer pressure change step S30, the hydrogen-oxygen generation method according to the first embodiment of the present invention preferably executes the water storage step S10 and the gas pressure adjustment step S20 again with the changed setting.

When having ended the transfer pressure change step S30, namely, the impedance determination step S31 and the pressure defined range update step S32, the hydrogen-oxygen generation method according to the first embodiment of the present invention proceeds to the electrolyzation step S40.

The electrolyzation step S40 is a step of transferring the water stored at the water storage step S10 toward the electrolytic cell 20 at transfer pressure in accordance with the pressure of pressurized gas adjusted at the gas pressure adjustment step S20, generating hydrogen and oxygen by electrolyzing, in the catalyst at the electrolytic cell 20, the water supplied to the electrolytic cell 20, and discharging the generated hydrogen and oxygen as separate generated gasses.

The hydrogen-oxygen generation system 10 according to the first embodiment includes the electrolytic cell 20 configured to generate hydrogen and oxygen by electrolyzing supplied water and discharge the generated hydrogen and oxygen as separate generated gasses, and thus the amount of hydrogen bubbles accumulated on the surface of a cathode and the amount of hydrogen remaining in supplied water are significantly reduced, and thus a circulation facility and a centrifugal separation facility for supplied water are not needed, which leads to reduction of size increase of the system. In addition, in the hydrogen-oxygen generation system 10 according to the first embodiment, the transfer pressure of supplied water is controlled by the accumulator 30, and thus the occurrence of pulsing to transferred water is reduced, which leads to reduction of instability of water supply.

In the hydrogen-oxygen generation system 10 according to the first embodiment, the gas supply unit 50 supplies one of the generated gasses generated by electrolyzing water at the electrolytic cell 20 to the gas chamber 34 as pressurized gas. With this configuration, in the hydrogen-oxygen generation system 10 according to the first embodiment, generated gas resources can be effectively utilized. In addition, the hydrogen-oxygen generation system 10 according to the first embodiment has a mechanism that the amount of generated gas supplied to the gas chamber 34 of the accumulator 30 increases in accordance with the amount of electrolyzed water, and accordingly, the amount of water supplied from the water storage chamber 33 of the accumulator 30 increases, and thus the amount of water supplied to the electrolytic cell 20 can be easily maintained constant. In addition, in the hydrogen-oxygen generation system 10 according to the first embodiment, the gas supply unit 50 merges pressurized gas discharged from the gas chamber 34, into the gas transfer pipe 13 through which generated gas is supplied to the gas chamber 34. With this configuration, in the hydrogen-oxygen generation system 10 according to the first embodiment, generated gas resources can be further effectively utilized.

The hydrogen-oxygen generation system 10 according to the first embodiment further includes the impedance meter 28 configured to measure the impedance of the electrolytic cell 20, and the impedance meter 28 changes the transfer pressure of water transferred to the electrolytic cell 20 based on the measured impedance. With this configuration, the hydrogen-oxygen generation system 10 according to the first embodiment can further reduce instability of water supply, suppress degradation of the electrolytic cell 20, and suppress increase of energy consumed in the generation of hydrogen and oxygen.

The hydrogen-oxygen generation system 10 according to the first embodiment further includes the dehumidifier 13c configured to dehumidify generated gas generated by the electrolytic cell 20. With this configuration, in the hydrogen-oxygen generation system 10 according to the first embodiment, water vapor corresponding to saturated vapor pressure included in generated gas is removed, which can suppress generation of water droplets due to dew condensation when temperature decreases.

The hydrogen-oxygen generation method according to the first embodiment, which is performed by the hydrogen-oxygen generation system 10, controls the transfer pressure of supplied water in the water storage step S10 and the gas pressure adjustment step S20 executed at the accumulator 30, and thus the occurrence of pulsing to transferred water is reduced, which leads to reduction of instability of water supply. In addition, in the hydrogen-oxygen generation method according to the first embodiment, hydrogen and oxygen are generated by electrolyzing supplied water and discharged as separate generated gasses at the electrolyzation step S40 executed at the electrolytic cell 20, and thus the amount of hydrogen bubbles accumulated on the surface of a cathode and the amount of hydrogen remaining in supplied water are significantly reduced, and thus a circulation facility and a centrifugal separation facility for supplied water are not needed, which leads to reduction of size increase of the system.

The hydrogen-oxygen generation method according to the first embodiment further includes the transfer pressure change step S30 of measuring the impedance of the electrolytic cell 20 and changing the transfer pressure based on the measured impedance. With this configuration, by the hydrogen-oxygen generation method according to the first embodiment, it is possible to further reduce instability of water supply, suppress degradation of the electrolytic cell 20, and suppress increase of energy consumed in the generation of hydrogen and oxygen.

Second Embodiment

Figure 4:
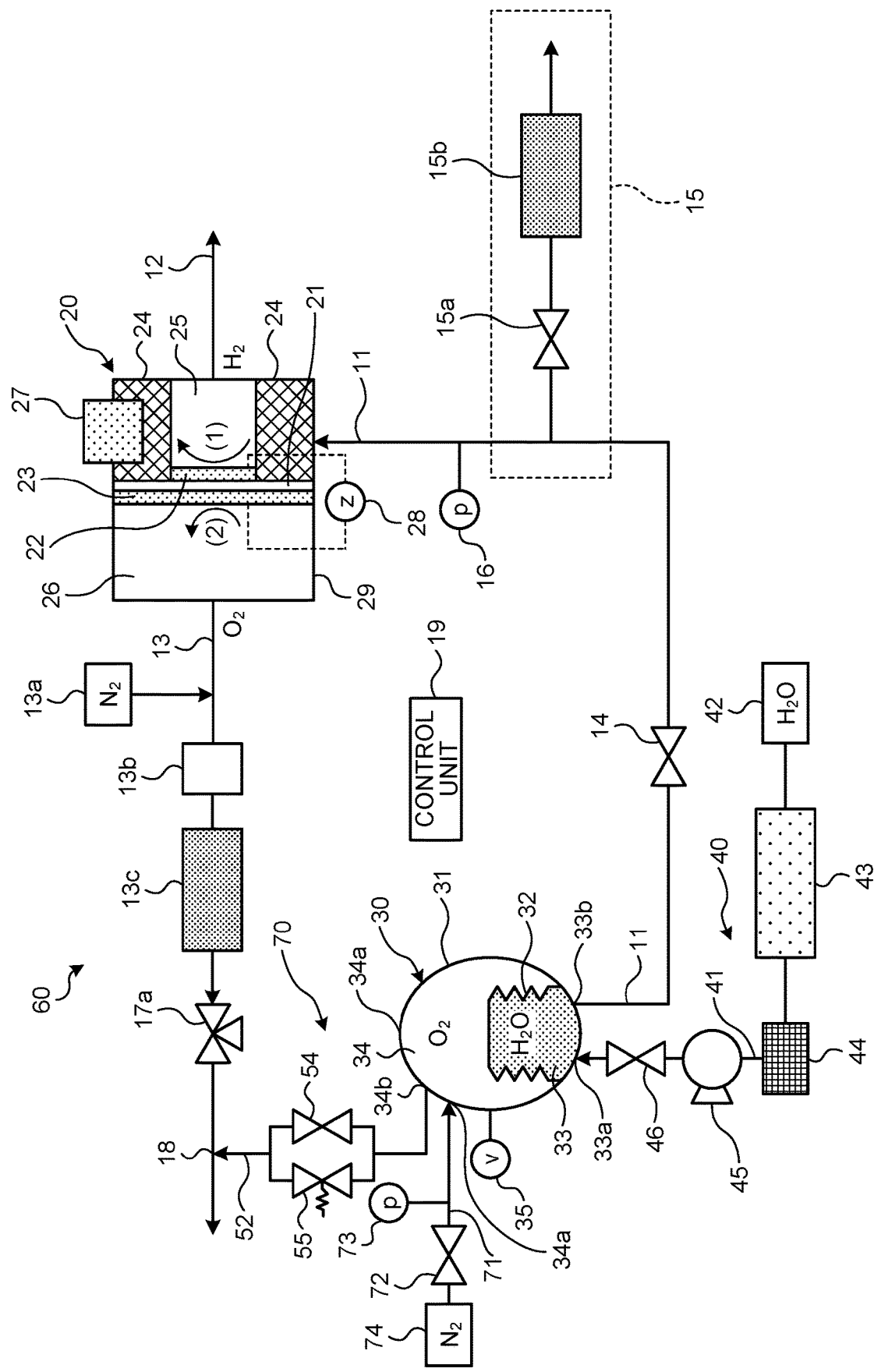
FIG. 4 is a schematic configuration diagram illustrating an exemplary hydrogen-oxygen generation system according to a second embodiment.
Figure 5:
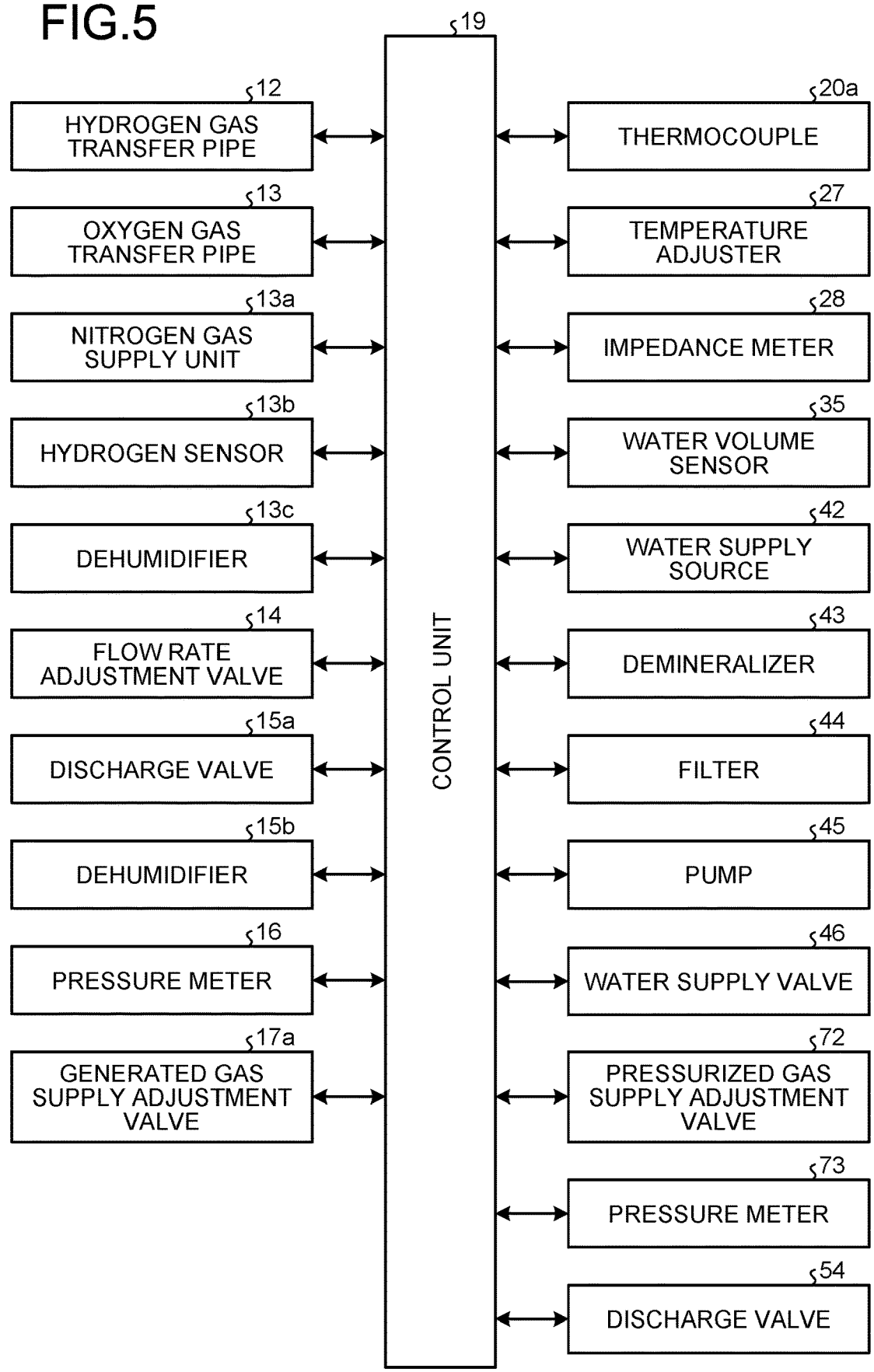
FIG. 5 is a control block diagram of the hydrogen-oxygen generation system in FIG. 4.

FIG. 4 is a schematic configuration diagram illustrating an exemplary hydrogen-oxygen generation system 60 according to a second embodiment. FIG. 5 is a control block diagram of the hydrogen-oxygen generation system 60 in FIG. 4. As illustrated in FIGS. 4 and 5, the hydrogen-oxygen generation system 60 according to the second embodiment is the hydrogen-oxygen generation system 10 according to the first embodiment in which the gas supply unit 50 configured to supply oxygen gas generated by electrolyzing water at the electrolytic cell 20 to the gas chamber 34 as pressurized gas is changed to a gas supply unit 70 configured to supply stock gas to the gas chamber 34 as pressurized gas. In description of the second embodiment, a component same as that in the first embodiment is denoted by a reference sign identical to that in the first embodiment, and detailed description thereof is omitted.

As illustrated in FIGS. 4 and 5, the hydrogen-oxygen generation system 60 according to the second embodiment is the hydrogen-oxygen generation system 10 according to the first embodiment in which the pressurized gas supply adjustment valve 17 is changed to a generated gas adjustment valve 17a. The generated gas adjustment valve 17a does not have connection with the gas supply pipe 51 in the pressurized gas supply adjustment valve 17, and accordingly, does not have the function to switch whether to allow communication between the oxygen gas transfer pipe 13 and the gas supply pipe 51 nor the function to change the opening degree of the pressurized gas supply adjustment valve 17 from the oxygen gas transfer pipe 13 toward the gas supply pipe 51.

As illustrated in FIG. 4, the gas supply unit 70 includes a gas supply pipe 71, the gas discharge pipe 52, a pressurized gas supply adjustment valve 72, a pressure meter 73, a stock gas source 74 that supplies nitrogen, the discharge valve 54, and the relief valve 55. The gas supply pipe 71 is communicated with the stock gas source 74 and the inlet 34a of the gas chamber 34 of the accumulator 30. The gas supply pipe 71 is provided with the pressurized gas supply adjustment valve 72 and the pressure meter 73 sequentially from the stock gas source 74 toward the inlet 34a.

The gas supply unit 70 has a configuration same as that in the first embodiment for the gas discharge pipe 52, the discharge valve 54, and the relief valve 55. Thus, the gas supply unit 70 merges stock gas discharged from the gas chamber 34, into the gas transfer pipe 13 for oxygen generated by electrolyzing water at the electrolytic cell 20. When the hydrogen-oxygen generation system 60 is used in cosmic space, the oxygen gas transfer pipe 13 is provided to, for example, discharge generated oxygen toward a cabin, and oxygen is often used in mixture with nitrogen, and thus, nitrogen as stock gas discharged from the gas supply unit 70 is merged into the oxygen gas transfer pipe 13 and effectively utilized.

The pressurized gas supply adjustment valve 72 switches the opened-closed state of the inside of the gas supply pipe 71, thereby switching a state in which stock gas as pressurized gas is supplied from the stock gas source 74 to the inlet 34a of the gas chamber 34 of the accumulator 30 through the gas supply pipe 71 and a state in which the stock gas supply is stopped. The pressure meter 73 is provided to the gas supply pipe 71 and measures atmospheric pressure inside the gas supply pipe 71, in other words, the pressure of pressurized gas in the gas chamber 34 of the accumulator 30.

As illustrated in FIG. 5, the control unit 19 according to the second embodiment is the control unit 19 according to the first embodiment in which the generated gas adjustment valve 17a, the pressurized gas supply adjustment valve 72, and the pressure meter 73 are electrically connected with each other to perform information communication therebetween in place of the pressurized gas supply adjustment valve 17 and the pressure meter 53.

The control unit 19 controls the pressure meter 73 and acquires, from the pressure meter 73, information of atmospheric pressure inside the gas supply pipe 71, in other words, information of the pressure of pressurized gas in the gas chamber 34 of the accumulator 30. The control unit 19 controls the pressurized gas supply adjustment valve 72 and the discharge valve 54 based on the information of the pressure of the pressurized gas in the gas chamber 34 of the accumulator 30, which is acquired from the pressure meter 73, thereby controlling the pressure of pressurized gas in the gas chamber 34 of the accumulator 30. The control unit 19 executes control of the discharge valve 54 and the like in the same manner as in the first embodiment.

Specifically, the control unit 19 controls the pressurized gas supply adjustment valve 72 based on the information of the pressure of the pressurized gas in the gas chamber 34 of the accumulator 30, which is acquired from the pressure meter 73, to switch the opened-closed state of the pressurized gas supply adjustment valve 72 inside the gas supply pipe 71, thereby switching the state of supply of stock gas as pressurized gas from the stock gas source 74 to the gas supply pipe 71, and acquires, from the pressurized gas supply adjustment valve 72, information related to the opened-closed state of the pressurized gas supply adjustment valve 72, thereby acquiring information related to the pressurized gas supply. In addition, the control unit 19 controls the pressurized gas supply adjustment valve 72 to change the opening degree of the pressurized gas supply adjustment valve 72 inside the gas supply pipe 71, thereby changing the transfer pressure of stock gas from the stock gas source 74 toward the gas supply pipe 71.

The control unit 19 controls the generated gas adjustment valve 17a to switch the opened-closed state of the generated gas adjustment valve 17a inside the oxygen gas transfer pipe 13, thereby switching the state of transfer of generated gas mainly made of oxygen through the oxygen gas transfer pipe 13, and acquires, from the generated gas adjustment valve 17a, information related to the opened-closed state of the generated gas adjustment valve 17a inside the oxygen gas transfer pipe 13, thereby acquiring information related to transfer of generated gas mainly made of oxygen through the oxygen gas transfer pipe 13.

Effects of the hydrogen-oxygen generation system 60 according to the second embodiment of the present invention will be described below. A hydrogen-oxygen generation method according to the second embodiment of the present invention as a processing method executed by the hydrogen-oxygen generation system 60 is the hydrogen-oxygen generation method according to the first embodiment of the present invention in which pressurized gas supplied to the gas chamber 34 of the accumulator 30 is changed from generated gas mainly made of oxygen to stock gas. The hydrogen-oxygen generation method according to the second embodiment of the present invention is same as the hydrogen-oxygen generation method according to the first embodiment of the present invention except for pressurized gas, and thus detailed description thereof is omitted.

In the hydrogen-oxygen generation system 60 according to the second embodiment, the gas supply unit 70 supplies stock gas to the gas chamber 34 as pressurized gas. With this configuration, in the hydrogen-oxygen generation system 60 according to the second embodiment, when it is difficult to supply generated gas as pressurized gas, or when it is not desired to supply generated gas as pressurized gas, as well, it is possible to excellently use the configuration that can reduce size increase and instability of water supply. In the hydrogen-oxygen generation system 60 according to the second embodiment, stock gas is nitrogen, and the gas supply unit 70 merges nitrogen discharged from the gas chamber 34, into the gas transfer pipe 13 for oxygen generated by electrolyzing water at the electrolytic cell 20. With this configuration, in the hydrogen-oxygen generation system 60 according to the second embodiment, stock gas resources can be effectively utilized.

Third Embodiment

Figure 6:
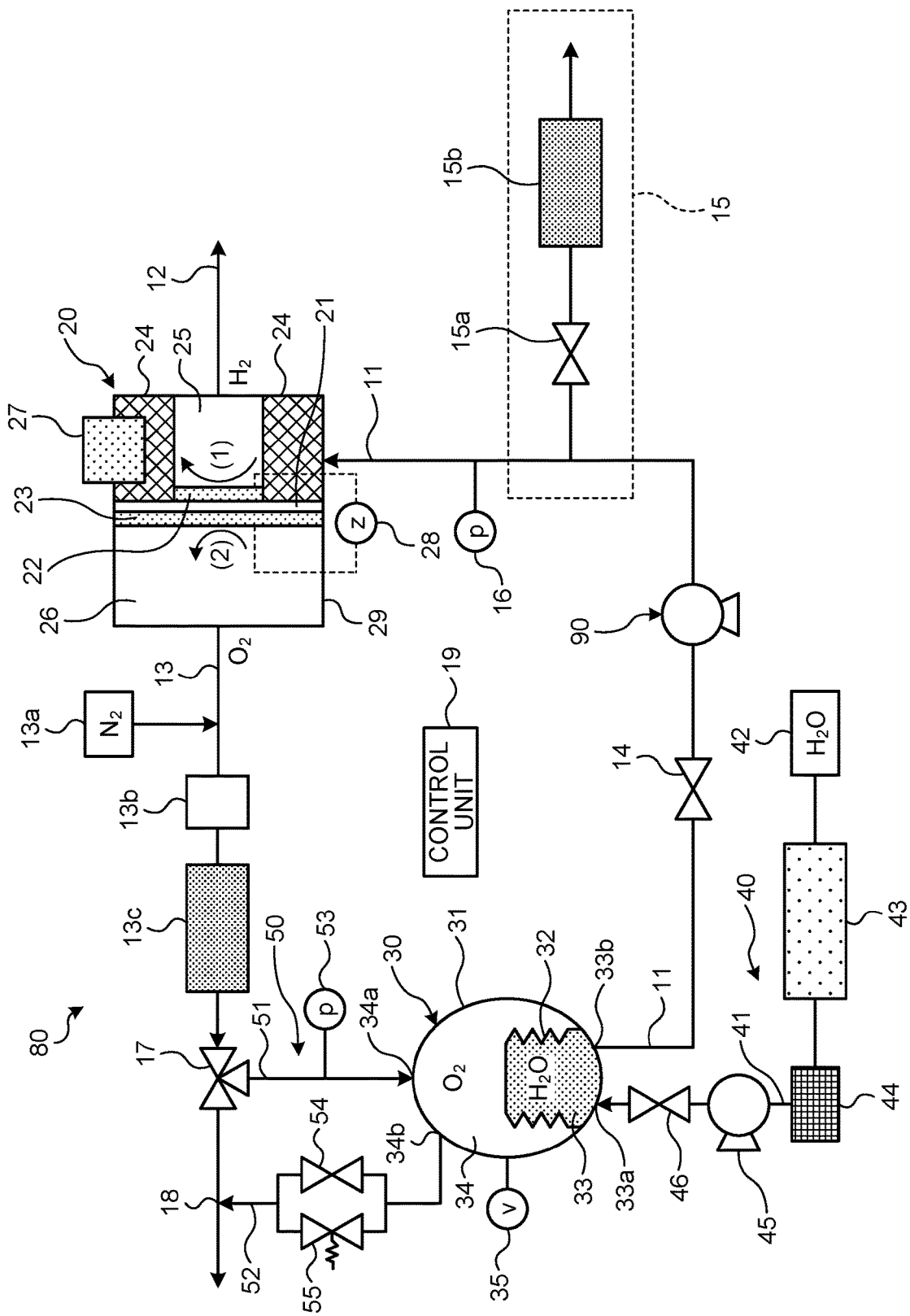
FIG. 6 is a schematic configuration diagram illustrating an exemplary hydrogen-oxygen generation system according to a third embodiment.
Figure 7:
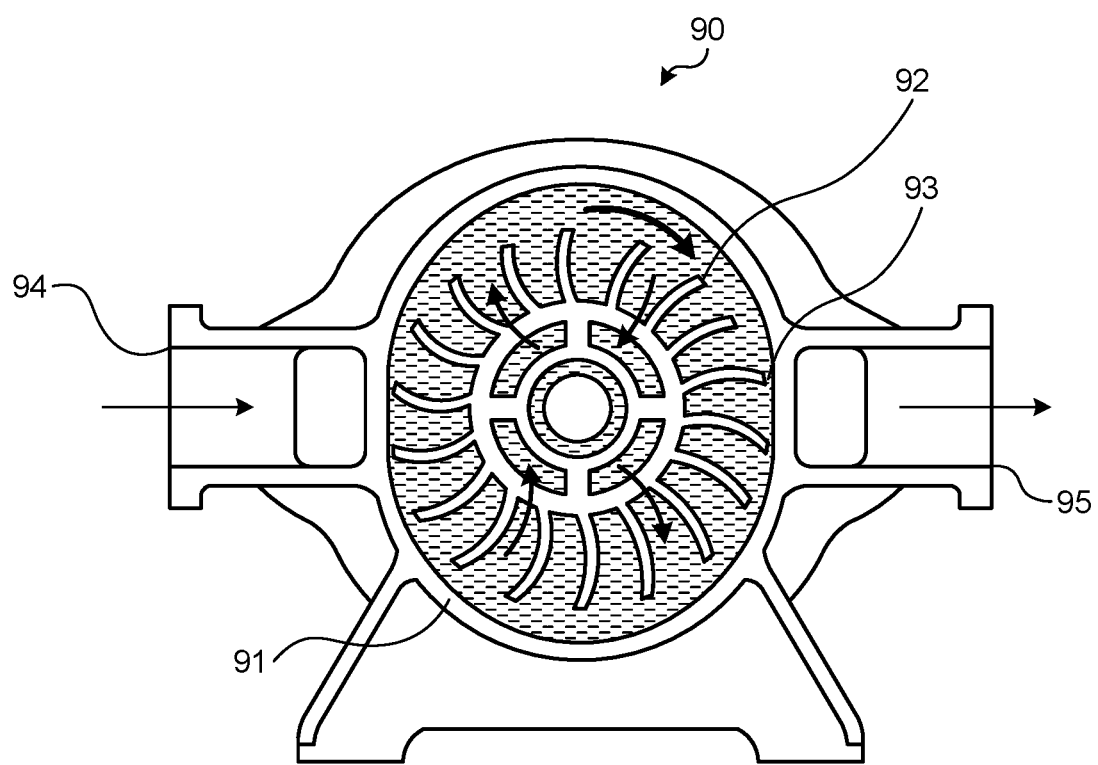
FIG. 7 is a schematic configuration diagram illustrating an exemplary transfer pump of the hydrogen-oxygen generation system in FIG. 6.
Figure 8:
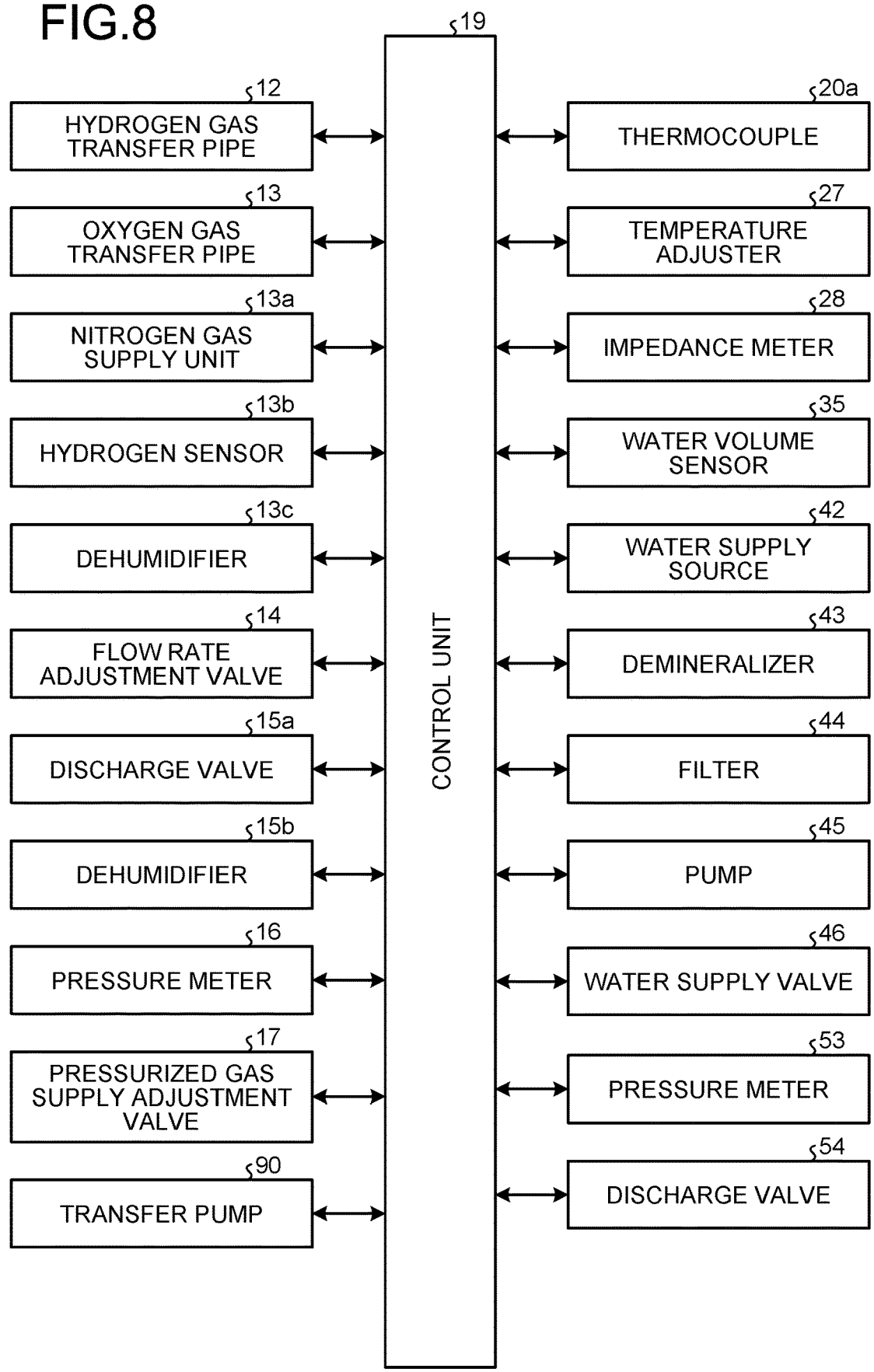
FIG. 8 is a control block diagram of the hydrogen-oxygen generation system in FIG. 6.

FIG. 6 is a schematic configuration diagram illustrating an exemplary hydrogen-oxygen generation system 80 according to a third embodiment. FIG. 7 is a schematic configuration diagram illustrating an exemplary transfer pump 90 of the hydrogen-oxygen generation system 80 in FIG. 6. FIG. 8 is a control block diagram of the hydrogen-oxygen generation system 80 in FIG. 6. As illustrated in FIGS. 6 and 8, the hydrogen-oxygen generation system 80 according to the third embodiment is the hydrogen-oxygen generation system 10 according to the first embodiment in which the transfer pump 90 is additionally provided to the water transfer pipe 11. In description of the third embodiment, a component same as that in the first embodiment is denoted by a reference sign identical to that in the first embodiment, and detailed description thereof is omitted.

As illustrated in FIG. 6, the transfer pump 90 is disposed on the water transfer pipe 11 between the water storage chamber 33 of the accumulator 30 and the electrolytic cell 20 and transfers, toward the electrolytic cell 20, water transferred from the accumulator 30. As illustrated in FIG. 7, the transfer pump 90 includes a casing 91 connecting an inlet 94 and an outlet 95 for water, and an impeller 92 disposed inside the casing 91, and the upper limit of the transfer pressure of water is set to be a predetermined pressure by setting a gap distance 93 between an inner wall of the casing 91 and a front end of the impeller 92 to be a predetermined distance. The transfer pressure of water increases as the gap distance 93 decreases, and thus the upper limit of the transfer pressure of water is set by setting the lower limit of the gap distance 93.

As illustrated in FIG. 8, the transfer pump 90 is electrically connected with the control unit 19 according to the third embodiment to perform information communication therewith. With this configuration, the control unit 19 controls the transfer pump 90 to switch the on-off state of the power of the transfer pump 90, thereby transferring water through the water transfer pipe 11 at transfer pressure equal to or lower than a predetermined water transfer pressure, and acquires, from the transfer pump 90, information related to actuation of the transfer pump 90.

Effects of the hydrogen-oxygen generation system 80 according to the third embodiment of the present invention will be described below. A hydrogen-oxygen generation method according to the third embodiment of the present invention as a processing method executed by the hydrogen-oxygen generation system 80 is the hydrogen-oxygen generation method according to the first embodiment of the present invention in which the pressurized gas supply step S22, the pressurized gas supply stop step S23, and the electrolyzation step S40 are changed.

At the pressurized gas supply step S22 of the hydrogen-oxygen generation method according to the third embodiment of the present invention, to decrease the pressure of the water, the control unit 19 may control the flow rate adjustment valve 14 to open the flow rate adjustment valve 14 and control the transfer pump 90 to turn on the transfer pump, thereby transferring water toward the electrolytic cell 20 through the water transfer pipe 11. In this case, at the pressurized gas supply step S22, similarly to the first embodiment, the control unit 19 recalculates the pressure of water stored in the water storage chamber 33 of the accumulator 30.

At the pressurized gas supply stop step S23 of the hydrogen-oxygen generation method according to the third embodiment of the present invention, when having decreased the pressure of the water instead of increasing the pressure of pressurized gas at the pressurized gas supply step S22, oppositely to the pressurized gas supply step S22, the control unit 19 may control the flow rate adjustment valve 14 to close the flow rate adjustment valve 14 or may control the transfer pump 90 to turn off the power of the transfer pump so that only the transfer pressure by the accumulator 30 is effective, thereby transitioning, to a stationary state, water transfer toward the electrolytic cell 20 through the water transfer pipe 11. In this case as well, at the pressurized gas supply stop step S23, similarly to the first embodiment, the control unit 19 recalculates the pressure of water stored in the water storage chamber 33 of the accumulator 30.

At the electrolyzation step S40 of the hydrogen-oxygen generation method according to the third embodiment of the present invention, the control unit 19 may control the transfer pump 90 to turn on the transfer pump, thereby transferring water toward the electrolytic cell 20 through the water transfer pipe 11. The other part of the hydrogen-oxygen generation method according to the third embodiment of the present invention is same as that of the hydrogen-oxygen generation method according to the first embodiment of the present invention, and thus detailed description thereof is omitted.

The hydrogen-oxygen generation system 80 according to the third embodiment further includes the transfer pump 90 disposed on the water transfer pipe 11 between the water storage chamber 33 of the accumulator 30 and the electrolytic cell 20 and configured to transfer, toward the electrolytic cell 20, water transferred from the accumulator 30, the transfer pump 90 includes the casing 91 connecting the inlet 94 and the outlet 95 for water, and the impeller 92 disposed inside the casing 91, and the upper limit of the transfer pressure of water is set to be a predetermined pressure by setting the gap distance 93 between the inner wall of the casing 91 and the front end of the impeller 92 to a predetermined distance. With this configuration, in the hydrogen-oxygen generation system 80 according to the second embodiment, the occurrence of pulsing to transferred water is further reduced by setting the upper limit of the transfer pressure, and thus instability of water supply can be further reduced.

REFERENCE SIGNS LIST

10, 60, 80 hydrogen-oxygen generation system
11 water transfer pipe
12 hydrogen gas transfer pipe
13 oxygen gas transfer pipe
13a nitrogen gas supply unit
13b hydrogen sensor
13c dehumidifier
14 flow rate adjustment valve
15 vacuum discharge line
15a discharge valve
15b dehumidifier
16 pressure meter
17, 72 pressurized gas supply adjustment valve
17a generated gas adjustment valve
18 pressurized gas discharge unit
19 control unit
20 electrolytic cell
20a thermocouple
21 catalyst membrane
22 first gas diffusion electrode
23 second gas diffusion electrode
24 water supply chamber
25 first generated gas discharge chamber
26 second generated gas discharge chamber
27 temperature adjuster
28 impedance meter
29 housing
30 accumulator
31 body
32 elastic body membrane
33 water storage chamber
33a, 34a, 94 inlet
33b, 34b, 95 outlet
34 gas chamber
35 water volume sensor
40 water supply unit
41 water supply pipe
42 water supply source
43 demineralizer
44 filter
45 pump
46 water supply valve
50, 70 gas supply unit
51, 71 gas supply pipe
52 gas discharge pipe
53 pressure meter
54 discharge valve
55 relief valve
73 pressure meter
74 stock gas source
90 transfer pump
91 casing
92 impeller
93 gap distance

The invention claimed is:

1. A hydrogen-oxygen generation system comprising:
an electrolytic cell configured to generate hydrogen and oxygen by electrolyzing water and discharge the hydrogen and the oxygen as separate generated gasses;
an accumulator including a water storage chamber configured to store water and a gas chamber configured to receive a pressurized gas, the water storage chamber and the gas chamber being separated from each other by an elastic body membrane, and the accumulator being configured to transfer the water stored in the water storage chamber toward the electrolytic cell at a transfer pressure in accordance with a pressure of the pressurized gas in the gas chamber;
a water supply unit configured to supply the water to the water storage chamber;
a gas supply unit configured to supply the pressurized gas to the gas chamber; and
a vacuum discharge line disposed on a water transfer pipe for the water between the water storage chamber of the accumulator and the electrolytic cell, the vacuum discharge line being configured to create a vacuum inside the water transfer pipe.

2. The hydrogen-oxygen generation system according to claim 1, wherein the gas supply unit is configured to supply one of the separate generated gasses to the gas chamber as the pressurized gas.

3. The hydrogen-oxygen generation system according to claim 2, wherein the gas supply unit includes:

a gas supply pipe connected to a gas transfer pipe, the gas transfer pipe being configured to transfer the one of the separate generated gasses to the gas supply pipe and the gas supply pipe being configured to supply the one of the separate generated gasses as the pressurized gas to the gas chamber; and a gas discharge pipe connected to the gas transfer pipe, the gas discharge pipe being configured to merge the pressurized gas discharged from the gas chamber into the gas transfer pipe.

4. The hydrogen-oxygen generation system according to claim 1, wherein the gas supply unit is configured to supply stock gas to the gas chamber as the pressurized gas.

5. The hydrogen-oxygen generation system according to claim 4, wherein:

the stock gas is nitrogen; and the gas supply unit is configured to merge the nitrogen discharged from the gas chamber into a gas transfer pipe for the oxygen.

6. The hydrogen-oxygen generation system according to claim 1, further comprising a transfer pump disposed on the water transfer pipe, the transfer pump being configured to transfer the water from the accumulator to the electrolytic cell, wherein:

the transfer pump includes a casing connecting an inlet for the water and an outlet for the water, and an impeller disposed inside the casing; and an upper limit of the transfer pressure of the water is a predetermined pressure based on a gap distance between an inner wall of the casing and a front end of the impeller being a predetermined distance.

7. The hydrogen-oxygen generation system according to claim 1, further comprising an impedance meter configured to measure an impedance of the electrolytic cell for changing the transfer pressure of the water transferred to the electrolytic cell based on the impedance.

8. The hydrogen-oxygen generation system according to claim 1, further comprising a dehumidifier configured to dehumidify each of the separate generated gasses.

9. A hydrogen-oxygen generation method comprising:

storing water in a water storage chamber by supplying the water from a water supply unit to the water storage chamber, the water storage chamber being separated, in an accumulator, by an elastic body membrane, from a gas chamber to which a first pressurized gas is supplied;

adjusting a pressure of the first pressurized gas in the gas chamber by supplying a second pressurized gas from a gas supply unit to the gas chamber; and transferring the water stored in the water storage chamber toward an electrolytic cell at a transfer pressure in accordance with the pressure of the first pressurized gas which has been adjusted;

generating hydrogen and oxygen by electrolyzing, at the electrolytic cell, the water supplied to the electrolytic cell;

discharging the hydrogen and the oxygen as separate generated gasses; and creating a vacuum inside a water transfer pipe for water between the water storage chamber of the accumulator and the electrolytic cell.

10. The hydrogen-oxygen generation method according to claim 9, further comprising measuring an impedance of the electrolytic cell and changing the transfer pressure of the water transferred to the electrolytic cell based on the impedance.

* * * * *